United States Patent
Cheng-Hsing et al.

(10) Patent No.: US 6,728,100 B2
(45) Date of Patent: Apr. 27, 2004

(54) PORTABLE COMPUTER AND METHOD FOR ASSEMBLING THE SAME

(75) Inventors: Liu Cheng-Hsing, Shijr (TW); Hsiao Jung-Shu, Shijr (TW); Tang Tsung-Lung, Shijr (TW)

(73) Assignees: Wistron Corp., Taipei (TW); Acer Inc., Taipei (TW)

( * ) Notice: Subject to any disclaimer, the term of this patent is extended or adjusted under 35 U.S.C. 154(b) by 0 days.

(21) Appl. No.: 10/118,052

(22) Filed: Apr. 9, 2002

(65) Prior Publication Data
US 2003/0072132 A1 Apr. 17, 2003

(30) Foreign Application Priority Data

Oct. 16, 2001 (TW) .................................... 90125604 A

(51) Int. Cl.[7] .................................................. G06F 1/16
(52) U.S. Cl. ...................... 361/683; 361/679; 361/687
(58) Field of Search ............................. 361/679–681, 361/683–686

(56) References Cited

U.S. PATENT DOCUMENTS

| | | | | |
|---|---|---|---|---|
| 5,103,377 A | * | 4/1992 | Kobayashi et al. | ......... 361/394 |
| 6,125,029 A | * | 9/2000 | Sasaki et al. | ............... 361/681 |

* cited by examiner

*Primary Examiner*—Darren Schuberg
*Assistant Examiner*—Yean-Hsi Chang
(74) *Attorney, Agent, or Firm*—Rabin & Berdo, P.C.

(57) ABSTRACT

A hinge assembly for pivotably connecting the display portion and the body portion of a portable computer includes a first fastening portion for attaching to the display portion, a second fastening portion for attaching to the body portion and a pivot portion for pivotably connecting the first fastening portion with the second fastening portion. The second fastening portion also has a first support arm for horizontally inserting into an insertion hole. Cables for transmitting signals and power extending from the display portion, are electrically connected through connectors to a cable connection region. The cable connection region is formed on the rear wall or bottom wall of the body portion. The hinge assembly of the invention greatly reduces the extraordinary sound resulting from the rotation of the display portion. Also, some covering components can be eliminated to make the assembly much easier.

21 Claims, 11 Drawing Sheets

PORTABLE COMPUTER AND METHOD FOR ASSEMBLING THE SAME

This application incorporates by reference Taiwanese application Serial No. 90125604, Filed Oct. 16, 2001.

BACKGROUND OF THE INVENTION

1. Field of the Invention

The invention relates in general to the assembly of the display portion and the body portion in a portable computer, and more particularly to a method for easily assembling a well-constructed portable computer.

2. Description of the Related Art

The computer has become one of the indispensable tools for modern people. A portable computer, such as a notebook computer (or called a lap-top computer), is much lighter and smaller than a desktop computer, and therefore is used increasingly as more and more people require mobility in performing work duties, surfing the Internet, and sending/receiving e-mails. Additionally, the falling price of the portable computer gradually wins the favor of the consumers. Because of the reasonable selling price and the portability, the portable computer has a great potential for replacing the bulky desktop computer.

Generally, the display portion of a portable computer is mounted on the top of a main body housing by the hinges. Please refer to FIG. 1, which shows a partial exploded perspective view of a conventional portable computer. The portable computer 100 includes a display portion 110 and a body portion 120. The display portion 110 includes a liquid crystal display (LCD) 112 and a display housing 114. The body portion 120 includes an upper case 122, a lower case 124 integrated with the upper case 122, and a keyboard 126 coupled to the upper case 122. Also, a main board 130 (partially shown in FIG. 1) is situated inside the body portion 120. A pair of hinge assemblies 116a and 116b is respectively provided at the bottom-left and bottom-right of the display portion 110.

Each of the hinge assemblies includes a first fastening portion (not show, embedded in the display portion 110 in this example), a second fastening portion 1161a, 1161b, and a pivot portion 1162a, 1162b for pivotably connecting the first fastening portion and the second fastening portion. Also, the support holes 128a, 128b and the threaded bolt holes 129a, 129b are formed in the body portion 120 at a predetermined depth. During assembling, the second fastening portions 1161a, 1161b are inserted into the support holes 128a, 128b, respectively. Then, the second fastening portions 1161a, 1161b are fixed to the body portion 120 by means of bolting, such as the bolts 1163a, 1163b respective through the threaded bolt holes 129a, 129b. Thereby, the display portion 110 can pivot between an open position and a closed position relative to the body portion 120 by the hinge assemblies 116a and 116b. Additionally, to transmit signals and supply with power, a cable 118 electrically couples the liquid crystal display (LCD) 112 to the main board 130.

However, there is a drawback in such assembling design for the conventional portable computer. An elongated region formed on the body portion 120, which is close to the keyboard 126, exposes part of the main board 130 and the hinge assemblies 116a, 116b. Typically, a couple of covering plates, made of the same material as the upper case, are required to cover this exposed region. In FIG. 1, the exposed region is covered by a middle cover 250 and two hinge covers 240a, 240b for hiding the cable 118, the main board 130, and the hinge assemblies 116a, 116b. FIG. 2 is a perspective view of the portable computer 100, which has been completely assembled.

According to the illustration above, because the hinge assemblies on the display portion are mounted on the top of the body portion, the partial area of the body portion has to be exposed for connecting with display portion (i.e. a couple of holes for bolting to the hinge assemblies). For the manufactures, mounting additional cover assemblies for hiding the exposed region is not only time-consuming but also raises the production cost. Moreover, it makes the upper case subject to undue stresses while the display portion is mounted on the top surface of the body portion. Consequently, as the display portion is being rotated, an extraordinary sound is easily produced and distortion may occur. The yield of product is also decreased.

SUMMARY OF THE INVENTION

It is therefore an object of the invention to provide an assembly of the liquid crystal display (LCD) and the body portion of the portable computer, in which the extraordinary noises resulting from the rotation of the LCD is greatly reduced and some covering components can be eliminated to make the assembly more easy.

According to the objective of the invention, the portable computer of the invention comprises a body portion, a display portion, a cable, and a hinge assembly. The body portion comprises a housing and a main board provided inside the housing. An insertion hole is formed on the rear wall of the housing, and a cable connection region is formed on the rear wall or bottom wall of the housing. A first connector is provided on the main board at a position corresponding to the cable connection region. One end of the cable is electrically connected to the display portion, and the other end of the cable is provided with a second connector corresponding to the first connector for electrically connecting to the body portion.

The hinge assembly, provided for pivotably connecting the display portion to the body portion, comprises a first fastening portion for attaching to the display portion, a second fastening portion for attaching to the body portion, and a pivot portion for pivotably connecting the first fastening portion with the second fastening portion. The second fastening portion further has a first support arm for horizontally inserting into an insertion hole formed on the rear side of the body portion.

Other objects, features, and advantages of the invention will become apparent from the following detailed description of the preferred but non-limiting embodiments. The following description is made with reference to the accompanying drawings.

DETAILED DESCRIPTION OF THE INVENTION

Figure 1:
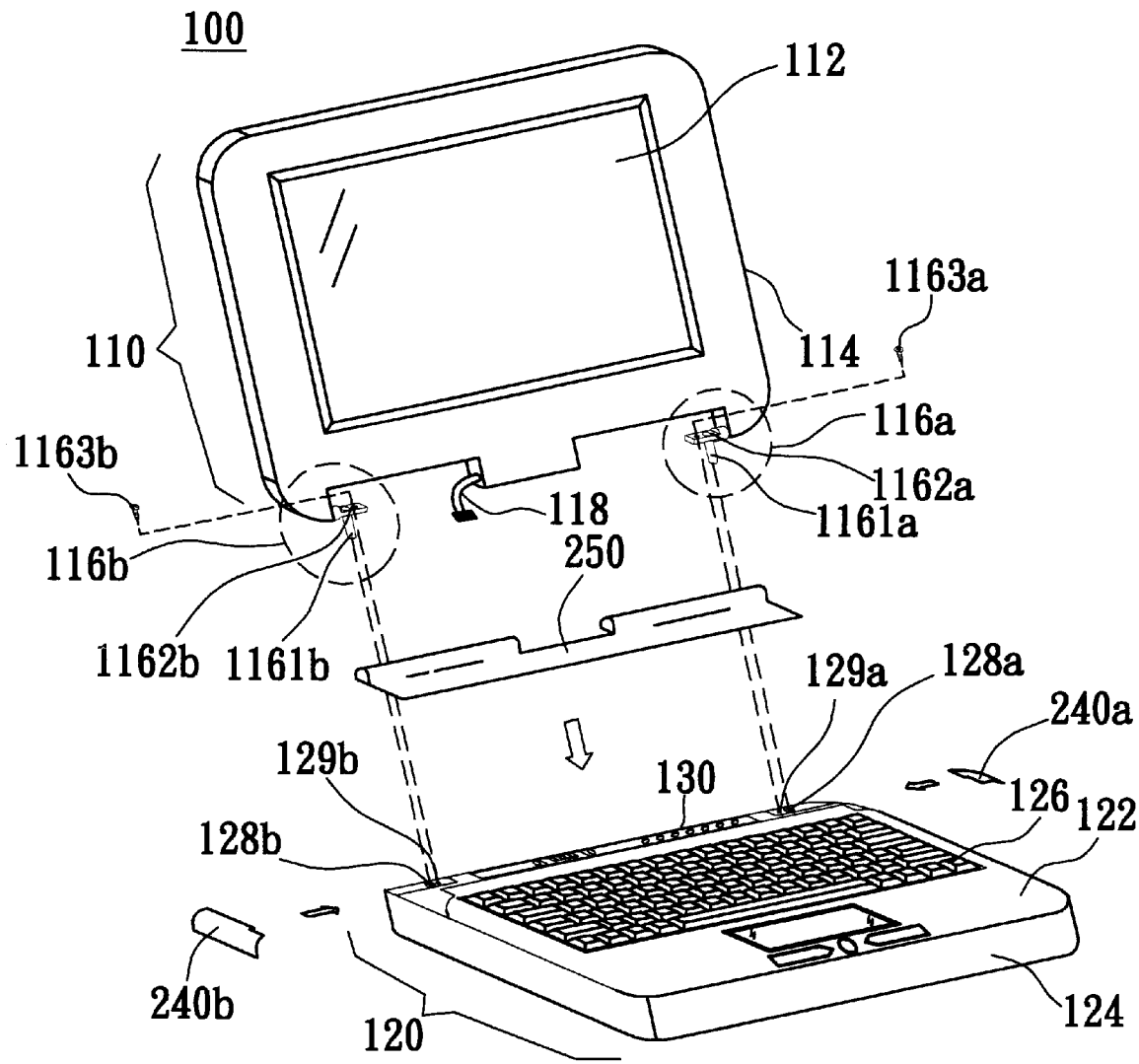
FIG. 1 (prior art) is a partial exploded perspective view of a conventional portable computer.
Figure 2:
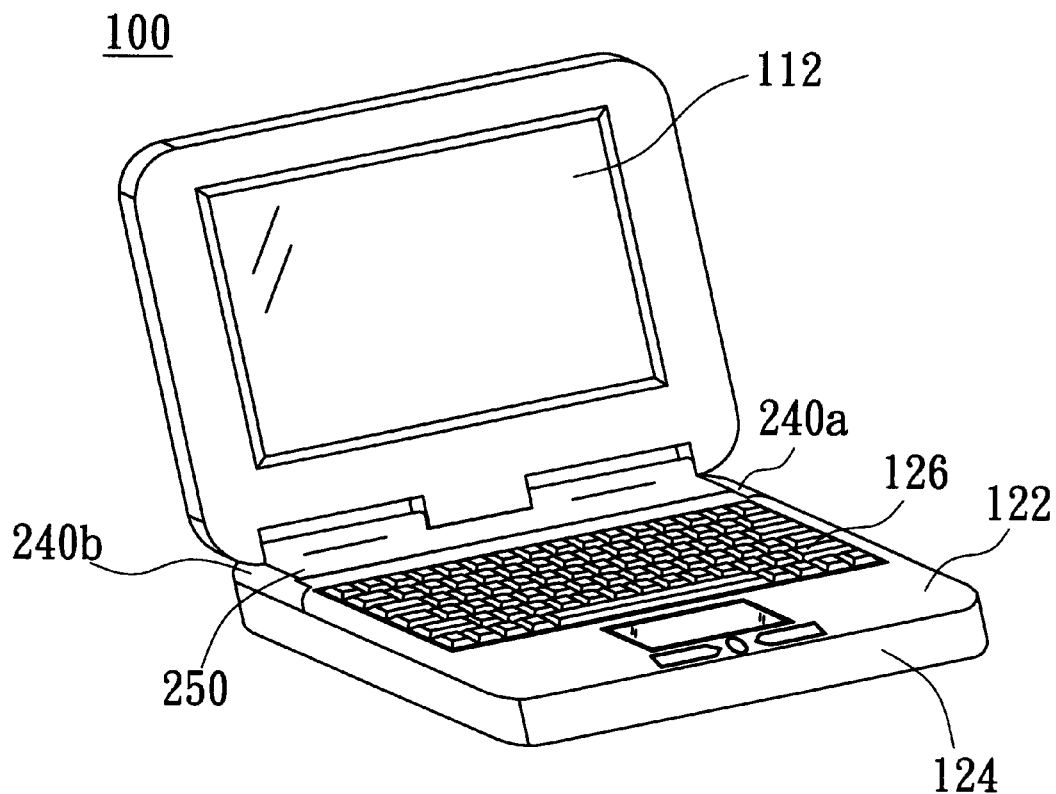
FIG. 2 (prior art) is a perspective view of the portable computer of FIG. 1, which has been completely assembled.

In the following description, a preferred embodiment is taken for illustrating the invention, but the invention is not limited hereto. Also, to avoid obscuring the invention, well-known elements not directly relevant to the invention are not shown nor described. Accordingly, the specification and the drawing are to be regard in an illustrative sense rather than a restrictive sense.

Figure 3:
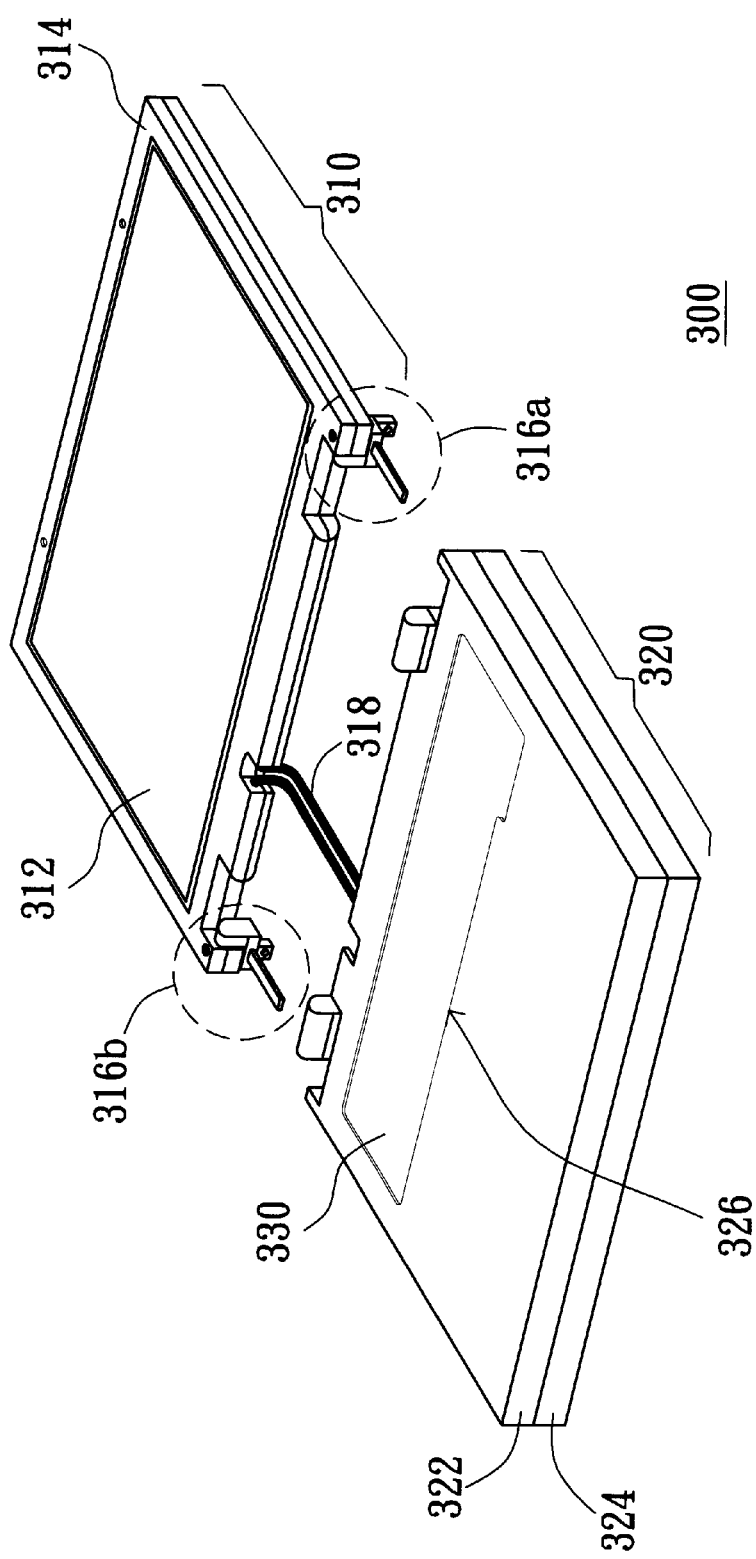
FIG. 3 is a schematic view of a portable computer according to the preferred embodiment of the invention, showing the assembly of the display portion and the body portion.

FIG. 3 is a perspective view of a portable computer according to the preferred embodiment of the invention. The portable computer 300 includes a display portion 310 and a body portion 320. The display portion 310 includes a liquid crystal display (LCD) 312 and a display housing 314. The body portion 320 includes an upper case 322, a lower case 324, and a main board 330, in which the lower case 324 is integrated with the upper case 322 to form a housing and the main board 330 (partially shown in FIG. 3) is situated inside the housing. Two hinge assemblies 316a and 316b are respectively attached to the bottom-right and bottom-left of the display housing 314 for pivotably connecting the display portion 310 to the body portion 320. The cable 318 extended from the underside of the display housing 314 is electrically connected to the main board 330 for transmitting signals and supplying power to the LCD 312. Also, a keyboard area 326 an exposed long-shaped region on the upper case 322, is formed for integrating with a keyboard (not shown in FIG. 3).

Figure 4:
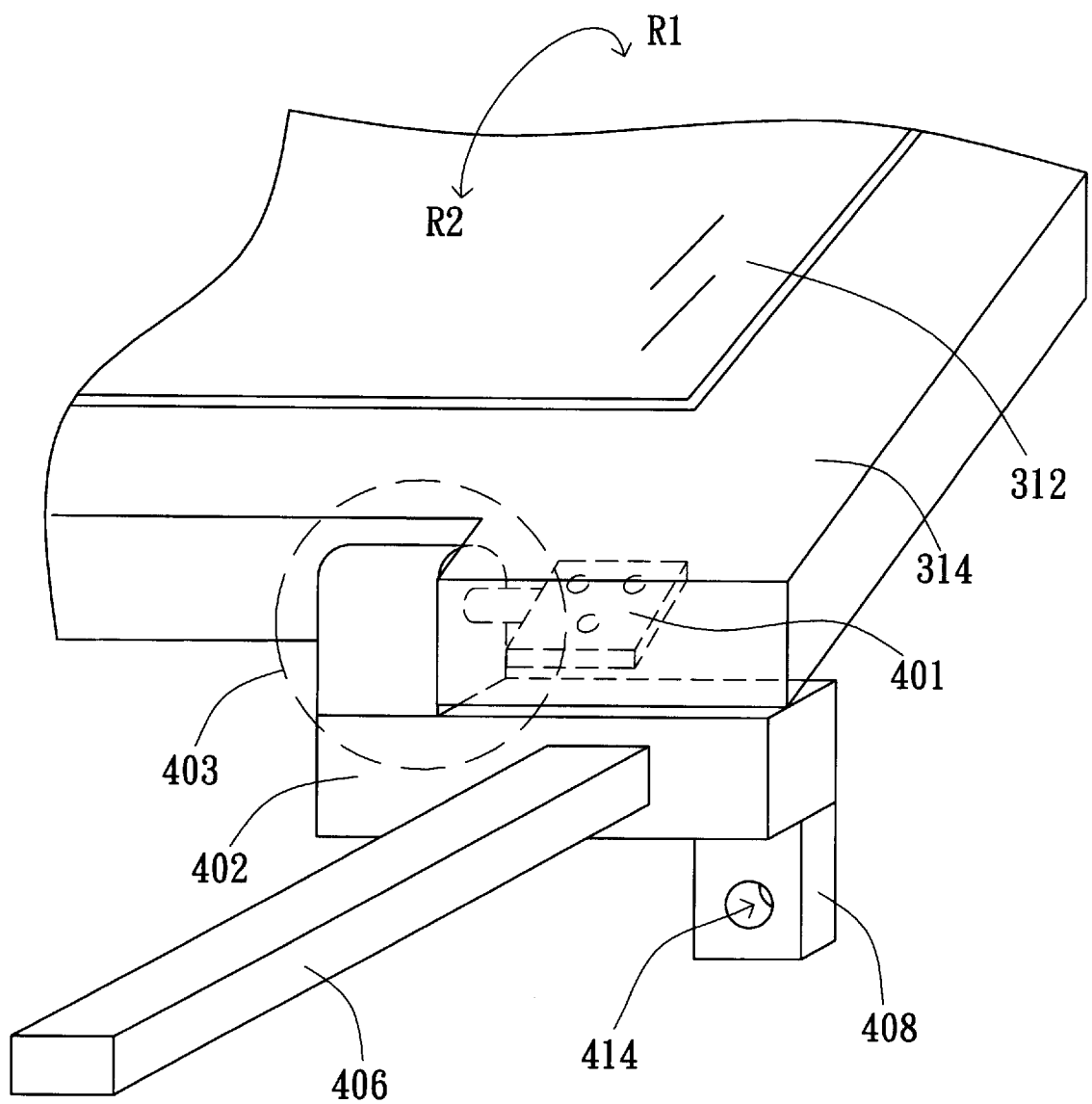
FIG. 4 is an enlarged view of a hinge assembly of FIG. 3.

FIG. 4 is an enlarged view of a hinge assembly in FIG. 3. The hinge assembly 316a is taken as an example. The hinge assembly 316a includes a first fastening portion 401, a second fastening portion 402, and a pivot portion 403, wherein the first fastening portion 401 as shown in phantom line is fixed inside the display housing 314 and takes charge for jointing the hinge assembly 316a to the display portion 310. Additionally, a first support arm 406 is vertically formed on the second fastening portion 402 and used for inserting into the rear side of the body portion 320; therefore, the second fastening portion 402 takes charge for jointing the hinge assembly 316a to the body portion 320. The pivot portion 403 for connecting the first fastening portion 401 and the second fastening portion 402 allows pivoting of the display portion 310 on the body portion 320 along the direction of R1 or R2.

In this preferred embodiment, the second fastening portion 402 further has a second support arm 408 vertical to the first support arm 406. There is a through hole 414 on the second support arm 408, and the position of the through hole 414 is corresponding to another threaded hole on the lower case 324. During assembling, the hinge assembly is bolted to the bottom case 324 by a fastening means, such as a bolt.

Figure 5A:
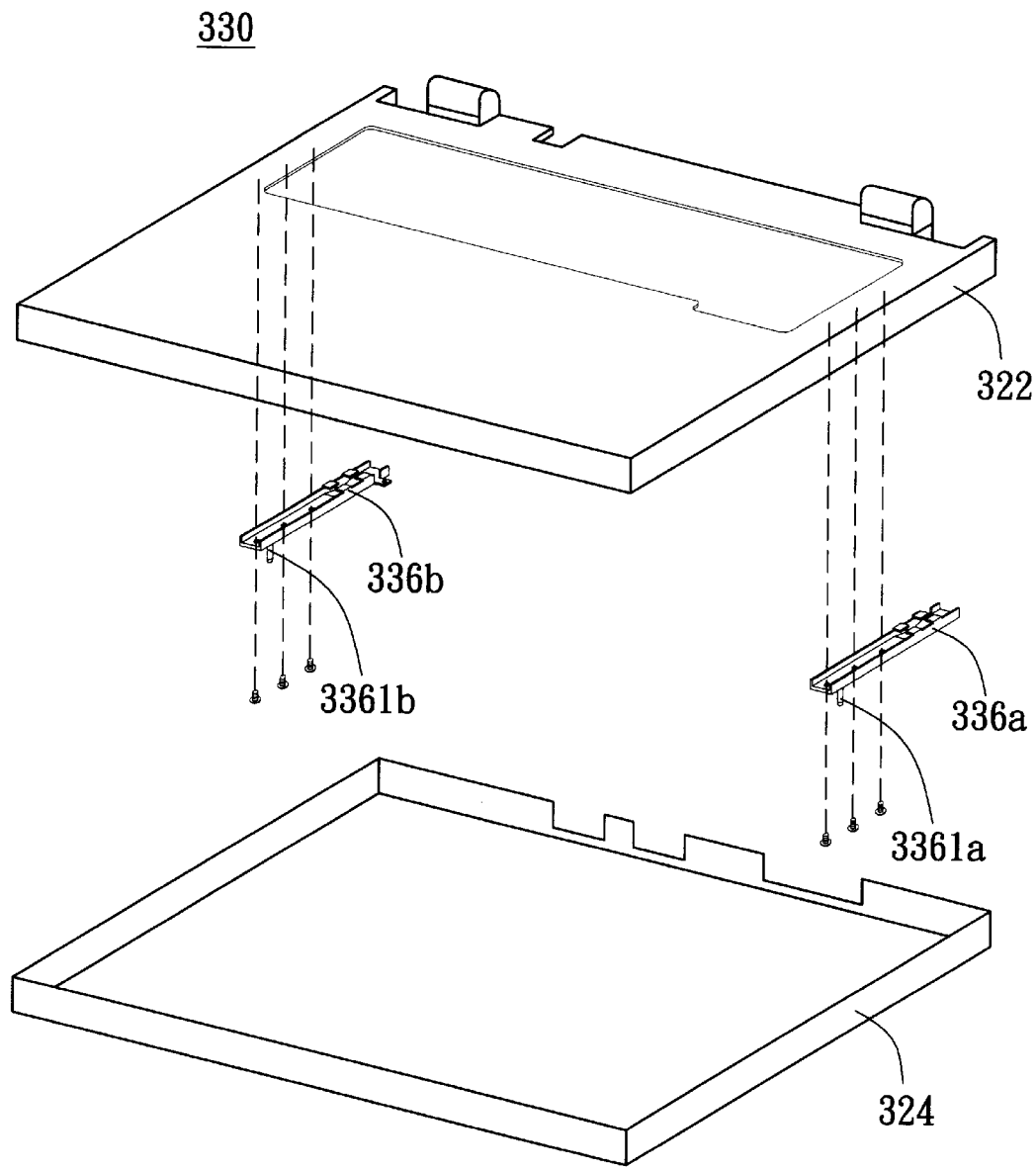
FIG. 5A is a partial exploded perspective view of the body portion of FIG. 3.
Figure 5B:
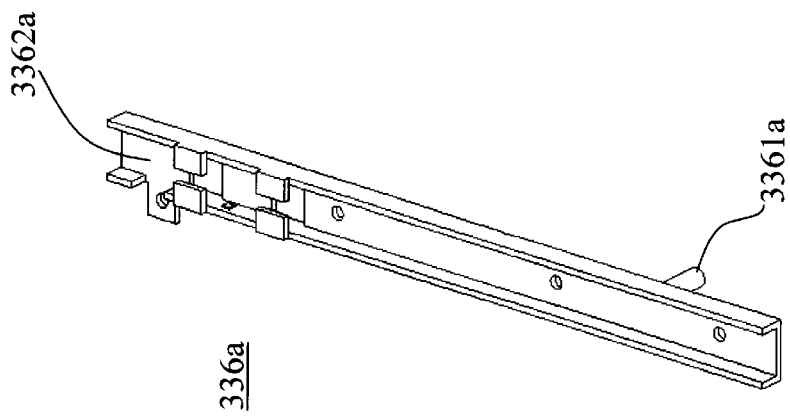
FIG. 5B is an enlarged view of a elongated frame of FIG. 5A.
Figure 5C:
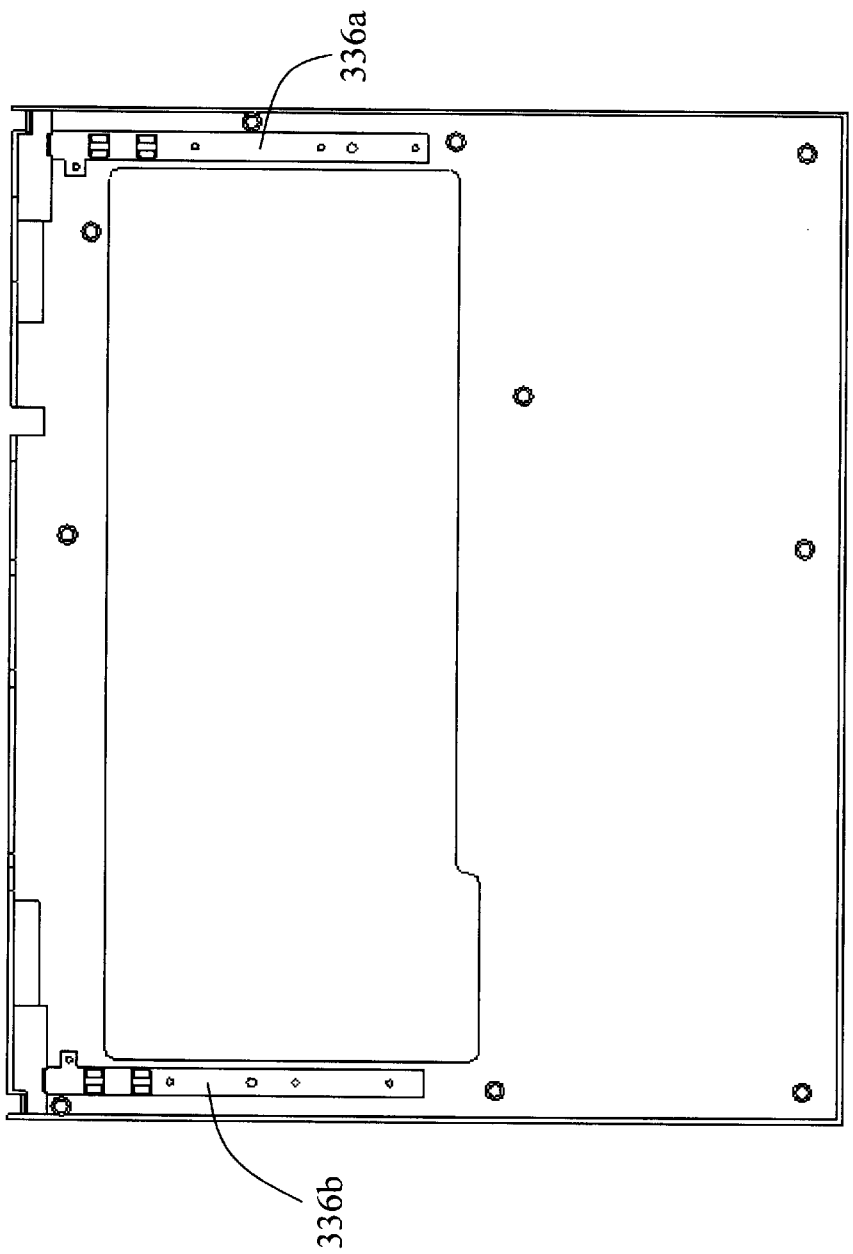
FIG. 5C is a top view of the body portion of FIG. 3.

Additionally, for the practical application, each of the inner sides of the housing of the body portion 320 is further provided with an elongated frame for receiving each of the first support arms 406 and also for reinforcing the housing of the body portion 320. The appearance and position of the frames are presented in FIG. 5A, FIG. 5B, and FIG. 5C. FIG. 5A is a partial exploded perspective view of the body portion of FIG. 3. FIG. 5B is an enlarged view of the elongated frame of FIG. 5A. FIG. 5C is a top view of the body portion of FIG. 3. The elongated frames 336a, 336b within the body portion 320 are horizontally attached to either the upper case 322 or the lower case 324 by fastening means. In this preferred embodiment, bolts are used for fixing the elongated frames 336a, 336b onto an inner wall of the upper case 322, as shown in FIG. 5A. The elongated frames 336a, 336b can reinforce the upper case 322 in the horizontal direction. Each of the elongated frames 336a, 336b further forms a channel for receiving and holding each of the first support arms 406 of the hinge assemblies 316a, 316b. The channel 3362a of the elongated frame 336a is shown in FIG. 5B. Also, support poles 3361a, 3361b are jointed to the elongated frames 336a, 336b, respectively. These support poles 3361a and 3361b can reinforce the housing of the body portion 320 in the vertical direction.

Figure 6:
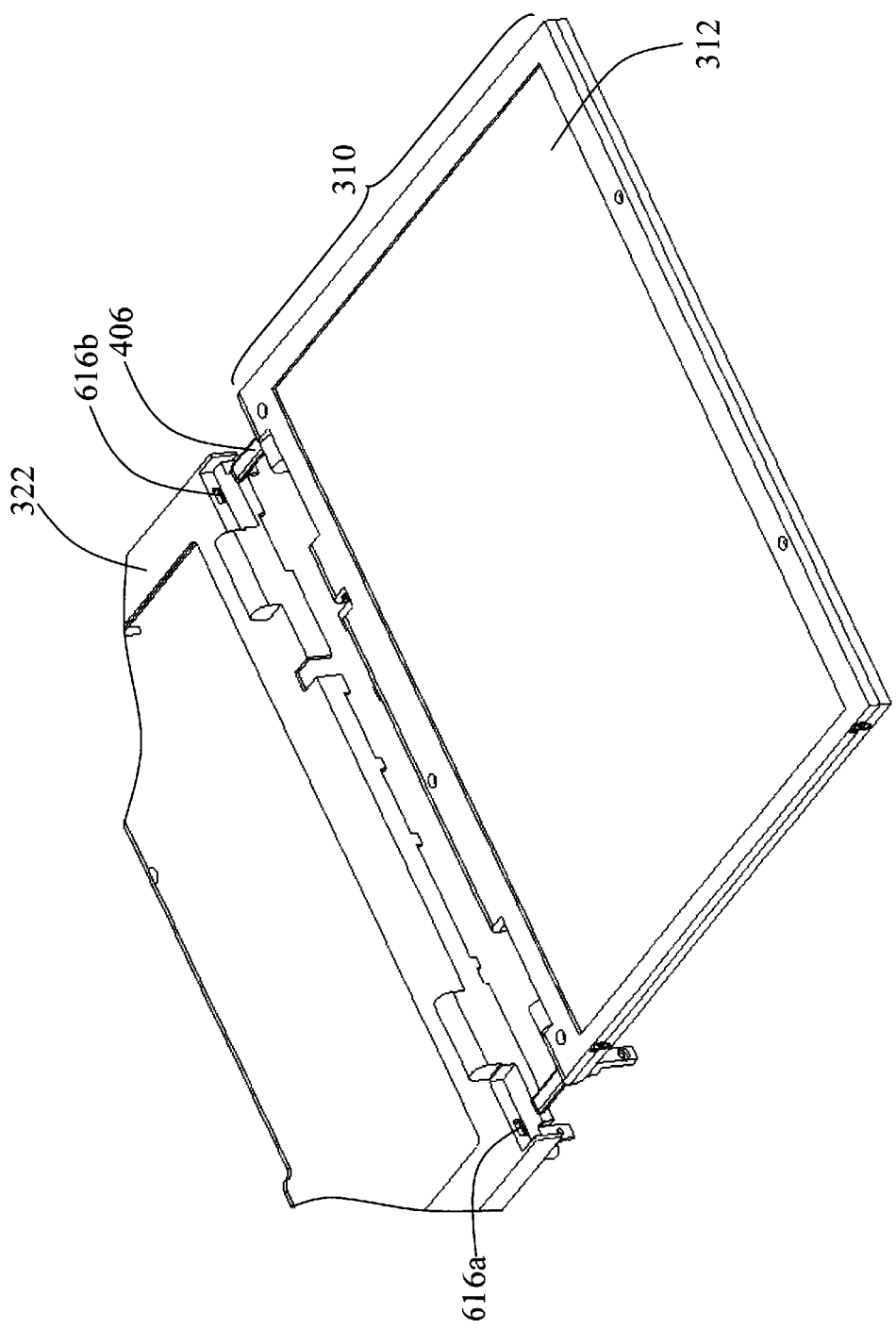
FIG. 6 shows the assembling the portable computer of FIG. 3.

FIG. 6 shows the assembling of the portable computer of FIG. 3. The insertion holes 616a, 616b are formed on the rear wall of the upper case 322. It clearly shows that each end of the elongated frames 336a, 336b horizontally mounted on the inner wall of the upper case 322 communicates with each of the insertion holes 616a, 616b. When assembling the display portion 310 to the body portion 320, the first support arms 406 are inserted into the insertion holes 616a, 616b and received in the channels of the elongated frames 336a, 336b. Then, the hinge assembly 316a, 316b are bolted to the body portion 320 of the portable computer.

The advantages of the elongated frames 336a, 336b include reinforcing the upper case 322, and supporting the weight of the display portion 310 as the first support arms 406 are received in the channels of the elongated frames 336a, 336b. Additionally, the support poles 3361a, 3361b standing on the lower case 324 further enhance the supporting ability of the elongated frames 336a, 336b. However, the invention is not limited hereto. The elongated frames of the invention can be mounted either on the upper case 322 or on the lower case 324. If the housing of the body portion 320 is made by metal, the frames could be an integrated part of the upper case 322 or of the lower case 324.

Figure 7:
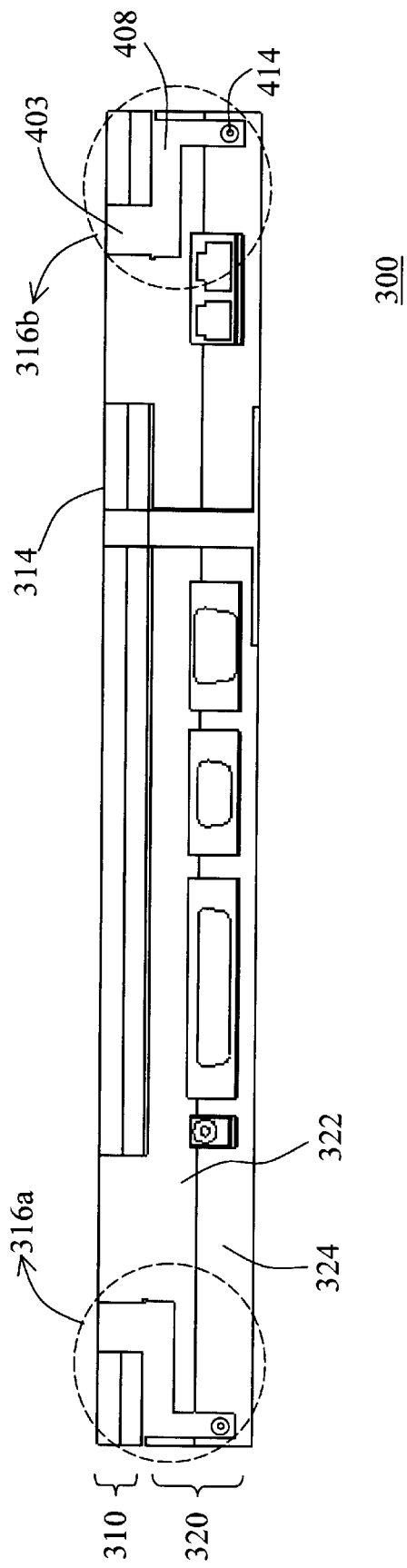
FIG. 7 is a rear view of the well-assembled portable computer according to the invention, in which the portable computer is in the closed position.

FIG. 7 is a back view of the well-assembled portable computer according to the invention, in which the portable computer is in the closed position. It clearly shows the positions of the hinge assemblies 316a, 316b related to the display portion 310 and the body portion 320. A bolt in the through hole 414 of the second support arm 408 is used for bolting the hinge assembly to the lower case 320. Consequently, the weight of the display portion is not concentrated on the upper case 322, but dispersed over the lower case 324 through the second support arm 408.

According to the foregoing description, the portable computer assembly in the method of the invention prevents the upper case 322 from being overloaded by the weight of the display portion 310, so that the hinges will be more stable during the rotation of the display portion 310. When the display portion 310 rotates relative to the body portion 320, those features of the invention greatly reduce the tendency to vibrate during rotation, and prevent making an extraordinary sound. The production yield of the portable computer is therefore increased. Moreover, because the display portion 310 is inserted to the rear wall of the upper case 322, the upper case 322 of the invention can be shaped as a whole, and the exposed region of the conventional portable computer is not required. Therefore, the portable computer of the invention does not need any additional covering plate, such as the hinge covers 240a, 240b and the middle cover 250 (FIG. 1). It will be more simple and quick to assemble the portable computer according to the invention.

Figure 8A:
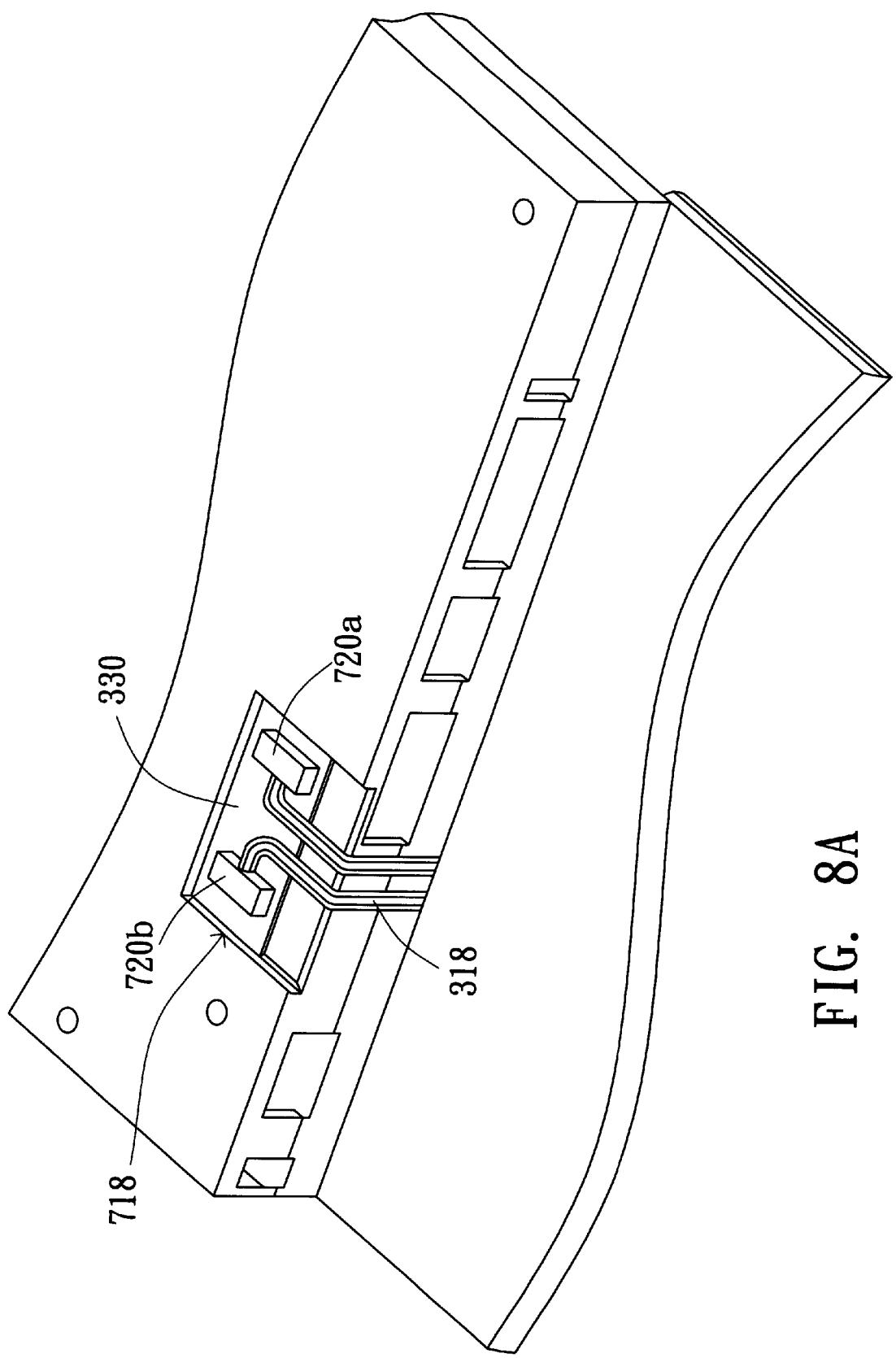
FIG. 8A shows the cable arrangement according to one embodiment of the invention.
Figure 8B:
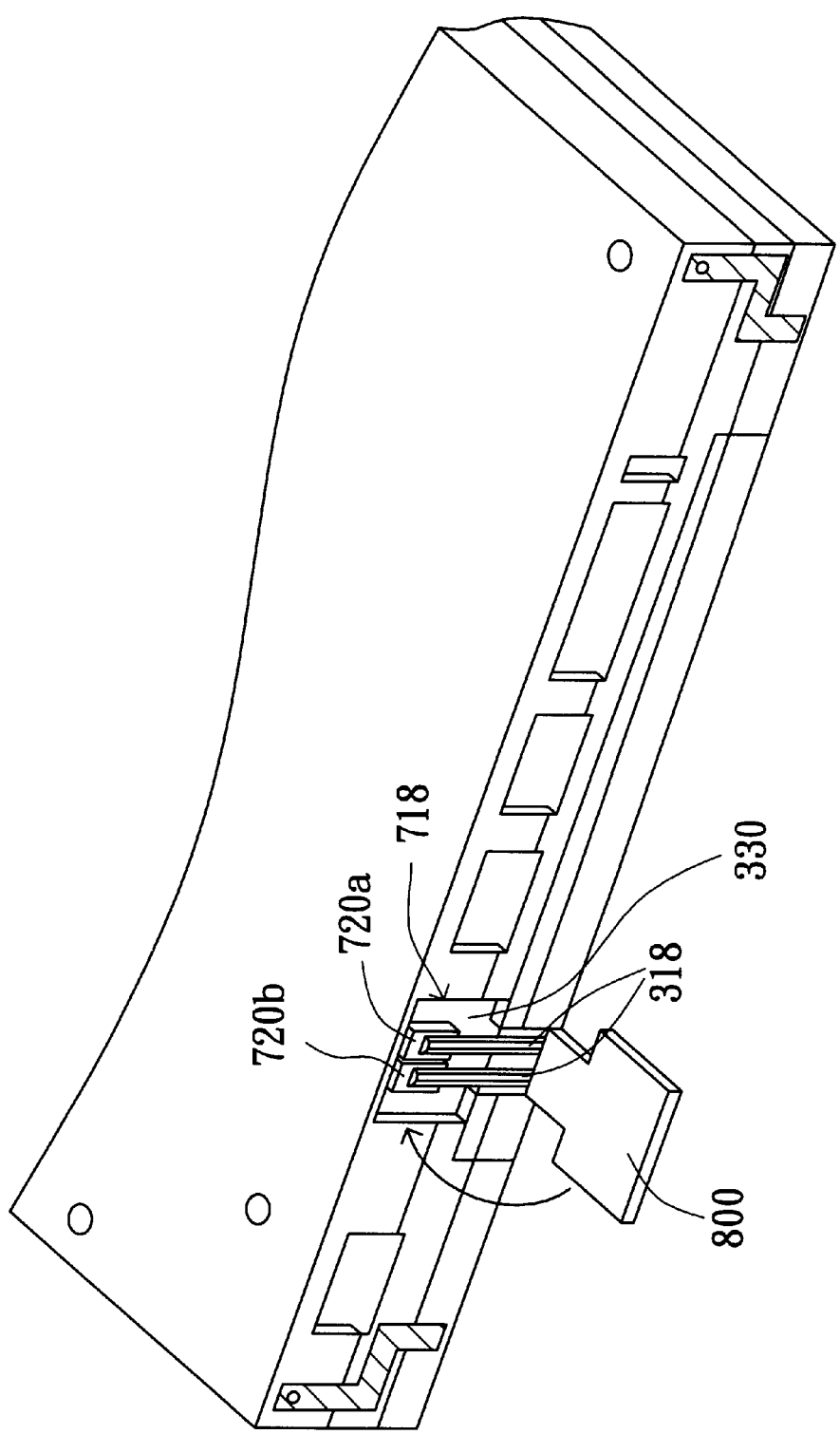
FIG. 8B shows the cable arrangement according to another embodiment of the invention.

According to the invention, the display portion 310 is inserted to the rear side of the body portion 320 so that the upper case 322 can be shaped as a whole, except the keyboard area 326 has to be formed for integrating with the keyboard as usual. For cooperating with this design, the cable extended from the underside of the display housing is arranged to pass through the rear side of the body portion 320 and then electrically connected to the main board 330. Referring to FIG. 8A, a top right view of the cable arrangement according to one embodiment of the invention. A cable connection region 718 is formed on the bottom wall of the lower case 324 for the purpose of exposing part of the main board 330. There are connectors equipped on the exposed part of the main board 330 for electrically coupling with the cable connectors 720a and 720b of the cable 318. In another embodiment, the cable connect region 718 is formed on the rear wall of the computer housing, as shown in FIG. 8B. In FIG. 8B, the cable connectors 720a and 720b are also coupled to the main board 330 for the purpose of transmitting signals and supplying power to the display portion 310.

After completing the cable connection, a cover plate 800 (shown in FIG. 8B but omitted in FIG. 8A), which rotatably attaches to the computer case, is used for covering the cable connection region 718. There is one thing to be noticed that is the cable connection region 718 can be formed on any position of the bottom or rear wall of the bottom case 324. FIG. 8A and FIG. 8B only represent two embodiments of the invention. However, the total length of the cable 318 and the easy-assembling position are the important concerns for the manufactures. The shorter the cable 318, the lower the cost.

According to the aforementioned descriptions, the assembly of LCD and body portion for portable computer of the invention has several advantages, including: (1) the extraordinary sound resulting from the rotation of the display portion is greatly reduced, and the production yield is thus increased; (2) some of the conventional components, such as the middle cover and the hinge cover, can be eliminated so that the assembling procedure is much easier; and (3) the cable situated behind the portable computer simplifies the manufacture flow, and also easy to be maintained or repaired.

While the invention has been described by way of examples and in terms of preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A hinge assembly for connecting a display portion to a body portion of a portable computer, comprising:
    a first fastening portion for attaching to the display portion;
    a second fastening portion for attaching to the body portion, said second fastening portion having a first support arm for horizontally inserting into an insertion hole formed on a rear side of the body portion, the first support arm extending toward a front side of the body portion; and
    a pivot portion for pivotably connecting said first fastening portion and said second fastening portion.

2. The hinge assembly according to claim 1, further comprising an elongated frame for horizontally attaching to an inner side of the body portion, said frame forming a channel communicating with the insertion hole for receiving said first support arm.

3. The hinge assembly according to claim 2, wherein the body portion includes a housing, and said elongated frame is attached to an inner wall of the housing to provide horizontal reinforcement for the housing.

4. The hinge assembly according to claim 3, wherein said elongated frame includes a support pole disposed vertically to said elongated frame for providing vertical reinforcement for the housing.

5. The hinge assembly according to claim 1, wherein said second fastening portion includes a second support arm disposed vertically to said first support arm for attaching said hinge assembly to the body portion.

6. A portable computer, comprising:
    a body portion having an insertion hole on a rear side;
    a display portion; and
    a hinge assembly for pivotably connecting said display portion to said body portion, comprising:
        a first fastening portion for attaching to said display portion;
        a second fastening portion for attaching to said body portion and having a first support arm for horizontally inserting into said insertion hole, the first support arm extending toward a front side of the body portion; and
        a pivot portion for pivotably connecting said first fastening portion and said second fastening portion.

7. The portable computer according to claim 6, further comprising an elongated frame for horizontally attaching to an inner side of said body portion, said elongated frame forming a channel communicating with said insertion hole for receiving said first support arm.

8. The portable computer according to claim 7, wherein said body portion includes a housing, and said elongated frame is attached to an inner wall of said housing to provide horizontal reinforcement for said housing.

9. The portable computer according to claim 8, wherein said elongated frame includes a support pole disposed vertically to the said elongated frame for providing vertical reinforcement for said housing.

10. The portable computer according to claim 6, wherein said second fastening portion includes a second support arm disposed vertically to said unit support arm for attaching said hinge assembly to said body portion.

11. A portable computer, comprising:
    a body portion, comprising:
        a housing having an insertion hole and a cable connection region, said insertion hole being formed on a rear wall of the housing; and
        a main board provided in the interior of said housing and having a first connector located corresponding to said cable connection region;
    a display portion;
    a cable having one end electrically connected to said display portion and the other end provided with a second connector corresponding to the first connector for electrically connecting to said body portion, and;
    a hinge assembly for pivotably connecting said display portion to said body portion, comprising:
        a first fastening portion for attaching to said display portion;
        a second fastening portion for attaching to said body portion and having a first support arm for horizontally inserting into the said insertion hole, the first support arm extending toward a front wall of the housing; and a pivot portion for pivotably connecting said first fastening portion and the second fastening portion.

12. The portable computer according to claim 11, wherein said cable connection region is formed on the rear wall of said housing.

13. The portable computer according to claim 1 wherein said cable connection region is formed on a bottom wall of said housing.

14. The portable computer according to claim 11, further comprising a cover plate for covering said cable connection region and said cable.

15. The portable computer according to claim 11, further comprising an elongated frame for horizontally attaching to the inner wall of said housing to provide horizontal reinforcement for said housing, said frame forming a channel communicating with the insertion hole for receiving said first support arm.

16. The portable computer according to claim 15, wherein said elongated frame includes a support pole disposed vertically to said elongated frame for providing vertical reinforcement for said housing.

17. The portable computer according to claim 11, wherein said second fastening portion includes a second support arm disposed vertically to the first support arm for attaching said hinge assembly to said body portion.

18. A method for assembling a portable computer, said portable computer including a body portion, a display portion and a hinge assembly, said method comprising the steps of:

attaching a first fastening portion of the hinge assembly to the display portion;

arranging the display portion together with the hinge assembly behind the body portion, and horizontally inserting a support arm provided on a second fastening portion of the hinge assembly into an insertion hole on a rear wall of the body portion, the support arm moving toward a front wall of the body portion during insertion; and attaching the second fastening portion of the hinge assembly to the body portion.

19. A portable computer, comprising;

a body portion that includes a case with a front side and a rear side, the rear side of the case having an insertion hole;

a display portion having a housing; and a hinge that includes a member fastened to the housing, a further member having an elongated arm which extends into the case through the insertion hole and toward the front side of the case, and an additional arm which extends adjacent the rear side of the case, means for connecting the additional arm to the body at a fastening location that is spaced apart from the insertion hole, and means for pivotably connecting the member and the further member.

20. The portable computer of claim 19, further comprising an elongated frame mounted inside the body portion to receive the elongated arm at least a portion of the frame having a generally U-shaped cross section.

21. The portable computer of claim 19, wherein the insertion hole is a first insertion hole and the hinge is a first hinge, wherein the rear side of the case additionally has a second insertion hole at a position spaced apart from the first insertion hole, and further comprising a second hinge, the second hinge including another member fastened to the housing, another further member having an elongated arm which extends into the case through the second insertion hole and an additional arm which extends adjacent the rear side of the case, means for connecting the additional arm of the another further member to the body at an another fastening location that is spaced apart from the second insertion hole, and means for pivotably connecting the another member and the another further member.

* * * * *